United States Patent
Lynam et al.

[15] 3,656,992
[45] Apr. 18, 1972

[54] METHOD OF COATING CELLULAR CORE STRUCTURES

[72] Inventors: Peter Henry Lynam, Linto; Keith Noakes, Cambridge, both of England

[73] Assignee: CIBA (A.R.L.) Limited, Duxford, Cambridge, England

[22] Filed: Feb. 17, 1970

[21] Appl. No.: 12,148

[30] Foreign Application Priority Data

Feb. 28, 1969 Great Britain......................11,006/69

[52] U.S. Cl................................117/43, 117/44, 156/197, 156/252, 161/68, 161/69, 161/109, 161/139
[51] Int. Cl.........................................B32b 3/12, B32b 31/00
[58] Field of Search......................161/68, 109, 149, 69, 127; 156/197, 250, 252, 513, 514; 117/44, 43; 264/154, 156

[56] References Cited

UNITED STATES PATENTS

| | | | |
|---|---|---|---|
| 3,400,186 | 9/1968 | Olson | 161/109 |
| 3,187,380 | 6/1965 | Harrison | 156/252 |
| 3,103,460 | 9/1963 | Picket | 156/197 |
| 3,097,439 | 6/1963 | Harrison | 264/156 |
| 2,902,589 | 9/1959 | Wirta | 161/68 |

Primary Examiner—Alfred L. Leavitt
Assistant Examiner—M. F. Esposito
Attorney—Harry Goldsmith, Joseph G. Kolodny and Mario A. Monaco

[57] ABSTRACT

A method of providing cellular core structures with fillets of adhesive, to core structures so provided with fillets, and to assemblies of such core structures and facing panels. The core structures are used in the aircraft and other industries as bonds to high strength facing panels.

16 Claims, No Drawings

METHOD OF COATING CELLULAR CORE STRUCTURES

This invention relates to a method of providing cellular core structures with fillets of adhesive, to core structures so provided with fillets, and to assemblies of such core structures and facing panels.

Constructional elements in which lightweight core is bonded to high-strength facing panels to constitute a sandwich structure are important in the aircraft and other industries. One of the most widely used forms of core for such sandwich structures is a honeycomb material made from strips of, for example, a metal such as stainless steel, titanium or aluminum, resin-impregnated glasscloth or paper, or a plastics material. It is essential that there should be a very strong but lightweight adhesive bond between the core and the facing panels. Hitherto this has usually been obtained by placing a film adhesive, i.e. an essentially solid film of an adhesive, between the core and the facing panels and then heating the assembly under pressure. Sometimes a liquid adhesive is also applied to the core and/or the facing panels.

To obtain the optimum strength to weight ratio, it is usual to provide that the cell axes in the honeycomb core are substantially at right angles to the facing panels. The open ends of the honeycomb cells are thus in contact with these panels, and the bond is formed between the panels and the edges of the strip material from which the core is made. Hence, the area of contact between the facing panels and core material is very small in comparison with the area of the panels, and to compensate for this the bond strength must be high. If a fillet of adhesive is formed at the junctions of the facing panels with the core material the bond strength can be increased, because the bonded area then extends beyond the edges of the core material, up the walls of the cells and partially onto the inner face of the panels.

Usually, however, when a film adhesive is employed, the whole of the inside of the facing panel, and not merely those areas of the panel in immediate contact with the edge sections, is coated by the adhesive. In some applications, such as sound-absorption structures, it is preferable, or even essential, that the facing panel be porous or at least permeable, and this is not the case if the whole of the inner face of the panel has been substantially coated with an adhesive film.

It has been proposed to apply a liquid heat-curable adhesive to the edge sections of the cells and to allow or cause the adhesive to form a hard, non-tacky deposit of the uncured adhesive on these edge sections. The liquid adhesive, which may be applied by dipping or by a roller, is induced to solidify by means such as cooling, evaporating solvent, or heating so that it gels. A limitation of this method is that many liquid adhesive compositions, although otherwise eminently suitable for bonding honeycomb core to facing panels, are difficult to use because the liquid adhesive forms "strings" of solidifying adhesive, or because the adhesive bridges the edge sections of the cells, or again because the liquid adhesive sometimes does not flow sufficiently, and the fillets formed are too flat.

Another disadvantage of these known methods is that those adhesives which are suitable for use in structures subjected to high temperatures are frequently not available as liquids.

It has now been found that fillets of adhesive can be produced on the edge sections of a cellular core structure by use of a film which is perforated, or at least weakened, inside the areas in immediate contact with the cell walls of the core. The film is heated so that it melts and contracts to form a fillet on the edge sections; when a film of a thermosetting adhesive is used, care is of course taken to avoid premature curing of the adhesive. Core so provided with fillets of adhesive may then be readily be bonded to permeable or porous facing panels.

The present invention accordingly provides a method of forming fillets of adhesive on the edge sections of cells in a honeycomb core, which comprises heating a film adhesive, in contact with the edge sections of the said cells and having holes or zones of weakness in areas bounded by those parts of the film in immediate contact with the edge sections of the said cells, so that the film adhesive melts and flows to form fillets of adhesive on the edge sections.

The present invention also provides honeycomb core provided with fillets of adhesive produced by the method of this invention and assemblies prepared by bonding, by means of the fillets of adhesive, one or more facing panels (preferably at least one of which is porous) to the said honeycomb core.

The film adhesive may be perforated, or provided with zones of weakness, and then draped in position over the honeycomb core. Alternatively the film adhesive may first be draped in position over the core, and the holes or zones of weakness then provided at the required locations. Holes may be made by puncturing the film with a pointed implement or with a hot wire. Zones of weakness may be produced during manufacture of the film, e.g. by use of a press with patterned plattens. If the holes are to be made while the film is draped over the honeycomb core, it may be helpful first to fix lightly the film in position on the core. This may be done by using a film with a tacky surface, or by briefly heating the film, once it is in place, so that it softens and flows to a small extent around, and adheres to, the edge sections of the core.

For convenience the honeycomb core cells contacting the film adhesive should be substantially uniform, and also substantially regular, i.e. symmetrical about an axis of rotation, such as in those kinds of honeycomb core known as square, egg-box, rectangular, hexagonal, reinforced hexagonal, tubular and sinusoidal, and the corrugated forms of these : hexagonal core is a particularly convenient form.

The holes or zones of weakness are best positioned substantially centrally within each area bounded by those parts of the film in immediate contact with the edge sections of the said cells, so that the fillets are evenly distributed around the edge sections. The proportion of the area of the hole or zone of weakness in each area of film adhesive bounded by the edge sections may vary from as little as 1 percent to as much as 25 percent, generally it will be from 5 percent to 15 percent. Holes should not be so small that, once formed, the cold-flow properties of the film cause them to close again. Preferred honeycomb core is that wherein the average maximum width of the cells contacting the film adhesive does not exceed 2 cm.

The assembly of core and film adhesive is heated, e.g. in an oven, so that the film softens, any zones of weakness become holes, and the holes enlarge until fillets are formed by surface tension on the edge sections of the cells. Excessive heating is to be avoided, otherwise the film adhesive may flow excessively and insufficient remain to form satisfactory fillets, or as already mentioned, if it is of a thermosetting plastics material, it may cure prematurely. Heating conditions used will depend on the composition of the film adhesive, the degree of filleting required, the proportion of film constituted by the holes or zones of weakness, and the heat capacity of the assembly. The assembly is then allowed to cool. If the core is to have on at least one face a permeable, or even porous, panel, it is often desirable to coat the core with a suitable protective preparation : this may be done before or after the core is provided with the fillets of adhesive.

Usually it is impracticable to form fillets simultaneously on both faces of the core. To provide fillets on both faces, one face, the uppermost, is treated as described, the core is then inverted, the face now at the bottom being placed on an essentially flat surface with release properties, i.e. one which is not bonded by the adhesive under the conditions used, and the process described is repeated.

The film adhesive may comprise a thermoplastic material, but preferably it essentially consists of a thermosetting plastics material, the fillets of adhesive being formed under conditions such that the adhesive remains thermosetting.

The core bearing the fillets of adhesive may be stored as required, subject to the "shelf-life" of the adhesive not being exceeded. Conventional methods, such as heating in a press, may be used to bond this core to facing panels.

Particularly preferred film adhesives are those wherein the thermosetting plastics material comprises an epoxide resin (i.e. a substance containing on average more than one 1,2-epoxide group per molecule), such as a polyglycidyl ether of a phenol or an alcohol, or a poly(N-glycidyl) derivative of an aromatic amine, and an effective amount of a curing agent therefor.

Advantageously these thermosetting film adhesives further contain a thermoplastic polymer such as a phenoxy resin or a polysulphone or a nylon.

The phenoxy resin which may be employed are linear polyarylene polyhydroxy polyethers, substantially free from 1,2-epoxide groups and having an average molecular weight of at least 10,000. They are generally copolymers of a dihydric phenol with either a diglycidyl ether of a dihydric phenol or with epichlorohydrin, and they contain recurring units of the structure

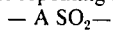

where R denotes the residue of a dihydric phenol after removal of the two phenolic hydroxyl groups. To prepare such resins a diglycidyl ether of, for example, bis(p-hydroxyphenyl)methane or 2,2-bis(p-hydroxyphenyl)propane may be copolymerised with the same phenol or with a different dihydric phenol such as bis(p-hydroxyphenyl)sulphone. Preferably, however, a dihydric phenol, especially 2,2-bis(p-hydroxyphenyl)propane, is copolymerised with epichlorohydrin.

Particularly preferred phenoxy resins are of the formula:

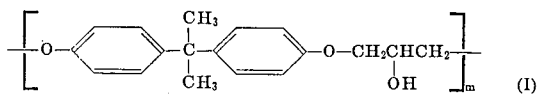 (I)

where $m$ has an average value in the range of 40 to 160.

The polysulphone resins which may be employed are linear polymers having an average molecular weight of at least 10,000 and containing the repeating unit:

$$- A\ SO_2 -$$

where A denotes a divalent aromatic group, which may be interrupted by ether oxygen and/or by divalent aliphatic groups. Especially suitable polysulphones are those obtained by reaction of a di-alkali metal salt of a dihydric phenol, such as the disodium salt of 2,2-bis(p-hydroxyphenyl)propane, with a bis(monochloroaryl)sulphone such as bis(p-chlorophenyl)sulphone.

Particularly preferred polysulphone resins are of the formula:

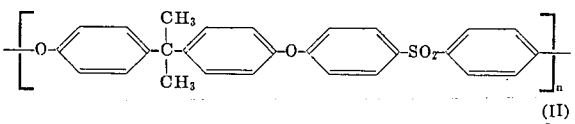
(II)

where $n$ has an average value in the range 50 to 120.

Usually from about 1 to 100, or even from about 1 to 150, but especially from 10 to 80, parts by weight of the phenoxy or polysulphone resin are employed per 100 parts by weight of the epoxide resin.

Other types of adhesive film may, of course, be used, the criterion of usefulness being whether the adhesive film is sufficiently "self-filleting" under the conditions employed. The ability to form fillets is governed by, amongst other factors, the viscosity and surface tension of the film adhesive in the liquid state, and this in turn depends on components of the adhesive, the presence of fillers, etc. Whether a particular film adhesive is suitable for use in particular circumstances can readily be determined by routine experiment.

The following Examples illustrate the invention. Unless otherwise specified, parts are by weight and mesh sizes are in accordance with British Standard 410.

The substances employed to form the film adhesives included the following:

"Epoxide resin A" is a polyglycidyl ether, prepared in a known manner from 2,2-bis(4-hydroxyphenyl)propane and epichlorohydrin in the presence of alkali, and purified by crystallisation. It was semisolid at room temperature and had a 1,2-epoxide content of approximately 5.7 equiv./kg.

"Epoxide resin B" is a polyglycidyl ether prepared in a known manner from 2,2-bis(4-hydroxyphenyl)propane and epichlorohydrin : it had a 1,2-epoxide content in the range 0.25 to 0.42 equiv./kg and its softening point, as determined by Durrans' method, was in the range 145° to 155°.

"Phenoxy resin A" is a resin available from Union Carbide Corporation under the designation PRDA-8060; it has the structure indicated by formula I, m having an average value of approximately 100.

"Polysulphone resin A" is a resin available from Union Carbide Corporation under the designation "Polysulphone P 3500". This has the structure indicated by formula II, its molecular weight being in the range 22,000 to 35,000.

EXAMPLE 1

Epoxide resin A (100 parts) and Phenoxy resin A (75 parts) were stirred at 200° C. for 1 hour in a Z-blade mixer, and then cooled to 115° C. Aluminum powder (44 parts) passing 200 mesh was mixed in, followed by, when the temperature had fallen to 110° C., 11 parts of dicyandiamide. After stirring had continued for a further half an hour, the mixture was cast into a film 0.25 mm thick.

This film was spread over a honeycomb core made from aluminum foil 0.1 mm thick : the core comprised regular hexagonal cells in which the sides were 6.3 mm long. The film was perforated with a metal punch in the centre of the areas defined by each cell, and the core and film were heated in an oven at 150° C. for 3 to 4 minutes, by which time the film had formed fillets of suitable size. Porous panels, comprising a woven fabric, were bonded onto the core by heating for 1 hour at 170° C. under a pressure of 0.35 kp/sq.cm. to cure the adhesive.

EXAMPLE 2

A film adhesive 0.25 mm thick was prepared as described in Example 1 from 100 parts of Epoxy resin A, 70parts of Polysulphone resin A (which had been first ground to pass 18 mesh), 12.5 parts of dicyandiamide, and 50 parts of aluminum powder (passing 200 mesh).

Fillets of adhesive were produced on the edge sections of honeycomb core as described in Example 1 except that the film and core were heated at 160° C. for 3 to 4 minutes. Porous panels were bonded onto the core by heating at 177° C under a pressure of 0.35 kp/sq.cm for 1 hour to cure the adhesive.

EXAMPLE 3

Epoxide resin B (90 parts) was ground to pass 72 mesh, and then stirred in a Z-blade mixer with 90 parts of Epoxide resin A for 1 hour at 180° C. The mixture was cooled to 60° C, and 2 parts of "Aerosil" finely dispersed in 10 parts of Epoxide resin A, 8.4 parts of dicyandiamide, and 0.2 part of N-benzyldimethylamine were then added. ("Aerosil" is a registered trade mark for a silica of large specific surface area).

A film 0.25 mm thick was cast at 60° C, and then draped over a honeycomb core. Fillets were formed as described in Example 1 by heating at 90° C for 3 to 4 minutes. Porous panels were bonded to the core by heating at 125° C under a pressure of 0.35 kp/sq.cm for 1 hour to cure the adhesive.

We claim:

1. Method of forming fillets of adhesive on the edge sections of cells in a honeycomb core, which comprises heating a film adhesive, which is in contact with the edge sections of the said cells and which has holes or zones of weakness in areas bounded by those parts of the film in immediate contact with the edge sections of the said cells, so that the film adhesive melts and flows to form fillets of adhesive on the edge sections.

2. Method according to claim 1, in which the film adhesive is perforated, or provided with zones of weakness, and then draped in position over the honeycomb core.

3. Method according to claim 1, in which the film adhesive is draped in position over the honeycomb core, and holes or zones of weakness are then provided at the required locations.

4. Method according to any of claim 1, wherein the holes or zones of weakness are positioned substantially centrally within each area bounded by those parts of the film in immediate contact with the edge sections of the said cells.

5. Method according to any of claim 1, wherein the honeycomb core cells contacting the film adhesive are substantially uniform.

6. Method according to any of claim 1, wherein the honeycomb core cells contacting the film adhesive are substantially regular.

7. Method according to claim 6, in which the said honeycomb core cells are hexagonal.

8. Method according to any of claim 1, wherein the average maximum width of the cells contacting the film adhesive does not exceed 2 cm.

9. Method according to any of claim 1, wherein the proportion of the area of the hole or zone of weakness in each area of film adhesive bounded by the edge sections is 1 percent to 25 percent.

10. Method according to claim 9, in which the said proportion is from 5 percent to 15 percent.

11. Method according to any of claim 1, wherein the film adhesive comprises a thermoplastics material.

12. Method according to any of claim 1, wherein the film adhesive essentially consists of a thermosetting plastics material, the fillets of adhesive being formed under conditions such that the adhesive remains thermosetting.

13. Method according to claim 12 wherein the thermosetting plastics material comprises an epoxide resin.

14. Method according to claim 12, in which the film adhesive also contains a thermoplastic polymer.

15. Method according to claim 14, in which the film adhesive contains an epoxide resin and, as the thermoplastic polymer, a phenoxy resin or a polysulphone.

16. Method according to claim 14, in which the film adhesive contains an epoxide resin, and, as the thermoplastic polymer, a nylon.

* * * * *